US005279224A

United States Patent [19]

Sprunger

[11] Patent Number: 5,279,224

[45] Date of Patent: Jan. 18, 1994

[54] CHARGE IMAGING SYSTEM FOR A PRINTING PRESS

[75] Inventor: Powell L. Sprunger, Algonquin, Ill.

[73] Assignee: Rockwell International Corporation, El Segundo, Calif.

[21] Appl. No.: 844,822

[22] Filed: Apr. 17, 1992

[51] Int. Cl.[5] ........................ B41N 1/12; G01D 15/06

[52] U.S. Cl. .................................... 101/465; 101/467; 101/DIG. 37; 346/158; 346/161; 346/74.5

[58] Field of Search ...................... 101/463.1, 465, 466, 101/467, DIG.; 346/74.5, 153.1, 158, 159, 161

[56] References Cited

U.S. PATENT DOCUMENTS

| | | | |
|---|---|---|---|
| 3,409,901 | 11/1968 | Dost et al. | 346/161 |
| 3,648,603 | 3/1972 | Kaminstein | 101/463.1 |
| 3,673,595 | 6/1972 | Inoue et al. | 346/158 |
| 3,761,951 | 9/1973 | Inoue et al. | 346/158 |
| 3,818,493 | 6/1974 | Slack | 346/161 |
| 3,821,931 | 7/1974 | Yamaji et al. | 101/DIG. 37 |
| 4,458,258 | 7/1984 | Amaya et al. | 346/153.1 |
| 4,718,340 | 1/1988 | Love, III | 101/467 |
| 5,129,321 | 7/1992 | Fadner | 101/465 |

FOREIGN PATENT DOCUMENTS

| | | | |
|---|---|---|---|
| 135248 | 6/1988 | Japan | 101/466 |
| 151455 | 6/1988 | Japan | 101/463.1 |
| 48947 | 2/1990 | Japan | 101/465 |

*Primary Examiner*—Edgar S. Burr
*Assistant Examiner*—Stephen R. Funk
*Attorney, Agent, or Firm*—C. B. Patti; H. F. Hamann

[57] ABSTRACT

An imaging system (12) for a printing press (10) having an imaging cylinder (44) having an outer surface (46) mobile to movement of charged particles, a device (52) for inducing a charge on the surface of the cylinder (44) of a first polarity, a film (48), a device (50) for passing the film (48) over at least a portion of the outer surface (46) of the imaging cylinder (44), a device (53) for passing charged particles of a second opposite polarity in a pattern through the film (48) onto the outer surface (46) of the imaging cylinder (44), a device (56) for passing a charged particulate material of the second polarity opposite the first polarity onto the film (48) over the pattern information on the cylinder (44) to form an image (80) of the particulate material (58) on the film (48), a device (62) for bonding the particulate material (58) onto the film (48), a print cylinder (36 or 38) having an outer surface (66), and a device (70) for placing a segment of the film (48) over the outer surface (66) of the print cylinder (36 or 38).

22 Claims, 8 Drawing Sheets

CHARGE IMAGING SYSTEM FOR A PRINTING PRESS

BACKGROUND OF THE INVENTION

The present invention relates to imaging systems for a printing press.

In the past, printing presses have utilized plate cylinders in conjunction with blanket cylinders in order to form printed images on a paper web as the web passes the blanket cylinders. Such plate cylinders have utilized plates containing the image for printing, and the plates have been secured to the outer surface of the plate cylinders for use. The plate cylinders have passed an ink image onto the blanket cylinders which in turn print the images on the web.

The formation of the plates has been time consuming, and it has been difficult to secure the plates onto the plate cylinders through the use of some locking mechanism. It has been particularly tedious and time consuming to maintain registration between a plurality of associated plate and blanket cylinders, thus rendering the printing press more inefficient.

More recently, it has been proposed to form the printing image directly upon a print cylinder, rather than forming separate plates. The print cylinders are then associated with the blanket cylinders, and the printing image is transferred from the print cylinders to the blanket cylinders for printing the image onto the web. However, many difficulties are still found to exist in such direct-to-press imaging systems, and much improvement is needed in such presses to obtain a satisfactory result. For example, such presses have required extensive cleaning of the print cylinders after their use, and have also required surface preparation of the print cylinders prior to placement of the image on the outer surface of the print cylinders.

SUMMARY OF THE INVENTION

A principal feature of the present invention is the provision of an improved imaging system for a printing press.

The imaging system of the present invention comprises, an imaging cylinder having an outer surface mobile to movement of charged particles, means for inducing a charge of a first polarity on the outer surface of the cylinder, a film, means for passing the film over at least a portion of the outer surface of the imaging cylinder, and means for passing charged particles of a second opposite polarity in a pattern through the film onto the outer surface of the imaging cylinder.

A feature of the present invention is the provision of means for passing a charged particulate material of the second polarity opposite to the first polarity onto the film over the charged information on the cylinder.

Another feature of the present invention is that an image is formed by the particulate material on the film.

Yet another feature of the invention is the provision of means for bonding the particulate material onto the film.

A further feature of the invention is that a printing image is formed by the system on the outer surface of the film.

Still another feature of the invention is that the particulate material may be fused onto the outer surface of the film.

Another feature of the invention is that the charge passing means forms a charged image on the cylinder.

Yet another feature of the invention is that the film may be severed into segments.

Still another feature of the invention is that the film segments may be placed on an outer surface of a print cylinder which transfers a print image to an associated blanket cylinder for printing the image onto a paper web.

Yet another feature of the invention is that the film segment may be releasably secured to the outer surface of the print cylinder by adhesive, such as pressure-sensitive adhesive or heat activated adhesive.

A feature of the invention is that the film segment may be easily removed from the print cylinder after printing has been completed.

Another feature of the invention is that the outer surface of the film may comprise a hydrophilic material.

Yet another feature of the invention is that the particulate material may comprise an oleophilic material.

Still another feature of the invention is that the particulate material may be blown onto the outer surface of the film.

Another feature of the invention is that provision of means for supplying information to the charge passing means.

Yet another feature of the invention is that the supplying means may comprise a computer.

A feature of the invention is that the printing image may be formed directly onto the printing cylinder.

Another feature of the invention is that the image may be formed in a more rapid and simplified manner onto the print cylinder.

A feature of the invention is the elimination of the necessity of a plate for a plate cylinder.

Yet another feature of the invention is that the image may be formed on the print cylinder at a reduced cost.

Still another feature of the invention is that the print image may be automatically formed on the print cylinder.

Another feature of the invention is that improved registration may be obtained between a plurality of print and blanket cylinders through use of the system of the present invention.

A further feature of the invention is that surface preparation of the print cylinder is minimized by the imaging system of the present invention.

Yet another feature of the invention is that the necessity of cleaning the outer surface of the print cylinder is eliminated by the imaging system of the present invention.

A further feature of the invention is that the film need only be removed to place the press in a condition for subsequent use.

Another feature of the invention is that the elimination of cleaning of the outer surface of the print cylinder enhances the wear of the print roll.

Yet another feature of the invention is that different widths of imaged film may be placed on the print cylinder, such as page wide films or press wide films.

Still another feature of the invention is that once a film has been removed from the print cylinder after a press run, it may be disposed in a simplified manner, and thus eliminates the need of a scrubbing or solvent cleaners for the print roll.

A feature of the invention is that the particulate image may be formed directly on the outer surface of the imaging roll, and may be transferred from the cylinder onto a charged film.

Yet another feature of the invention is that the particulate material and film may be given charges of opposite polarity to achieve this result.

A feature of the invention is that the film may be placed directly on the print roll prior to imaging, and the particulate image may be formed directly onto the film over the roll.

Another feature of the invention is that placement of the film onto the cylinder prior to the formation of the image eliminates possible distortion of the film during placement onto the roll, such as by heat applied to the film prior to placement.

Yet another feature of the invention is that the film has an outer surface mobile to movement of charged particles, and the image may be placed on an outer surface of an imaging device which need not be a cylinder or an outer surface of the film.

Further features will become more fully apparent in the following description of the embodiments of this invention, and from the appended claims.

DESCRIPTION OF THE PREFERRED EMBODIMENTS

Figure 1:
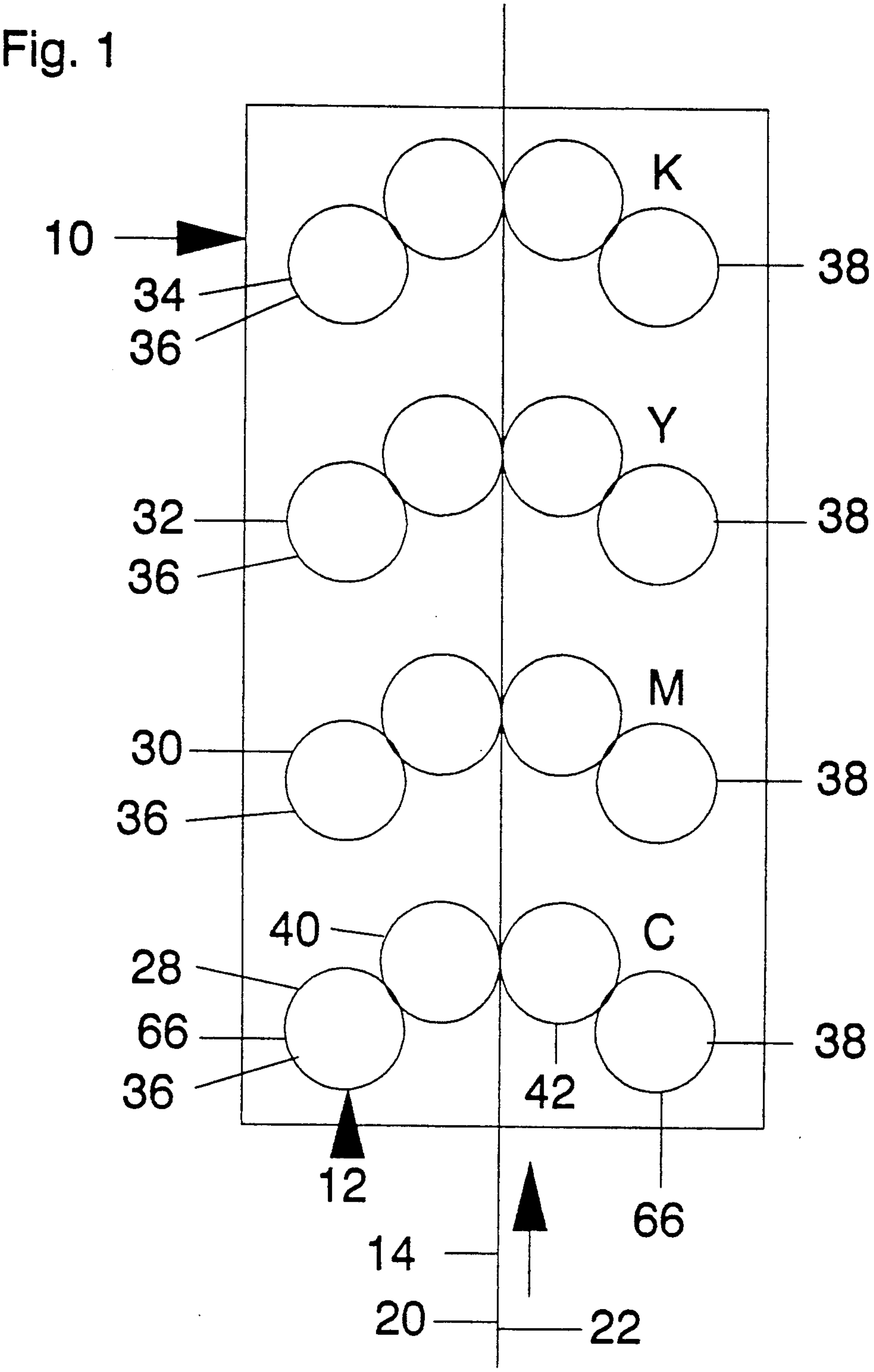
FIG. 1 is a diagrammatic view of a printing press having an imaging system of the present invention.

Referring now to FIG. 1, there is shown a printing press generally designated 10 having an imaging system generally designated 12 to facilitate printing an image on a paper web 14. The press 10 has a plurality of printing units 28, 30, 32, and 34 for printing different colors of ink on the web 14. As shown, the printing unit 28 may print an ink having a color Cyan C, the printing unit 30 may print an ink having a color Magenta M, the printing unit 32 may print an ink having a color Yellow Y, and the printing unit 34 may print an ink having a color black K in a four-color press 10.

The printing units 28, 30, 32, and 34 each have a plurality of print rolls or cylinders 36 associated with a blanket cylinder or roll 40. During printing by the press 10, an image of the ink is transferred from the print rolls 36 to the associated blanket rolls 40 to print the image on one surface 20 of the web 14. In addition, the press 10 may have a plurality of printing units having a plurality of print rolls 38 associated with a plurality of blanket rolls or cylinders 42 on an opposed side 22 of the web 14 in order to transfer the ink image from the print rolls 38 to the blanket rolls 42 for printing an image on the other surface 22 of the web 10. The imaging of the print rolls is discussed below, and the discussion is equally applicable to either the print rolls 36 or the print rolls 38 on the opposed sides 20 and 22 of the web 14.

Figure 2:
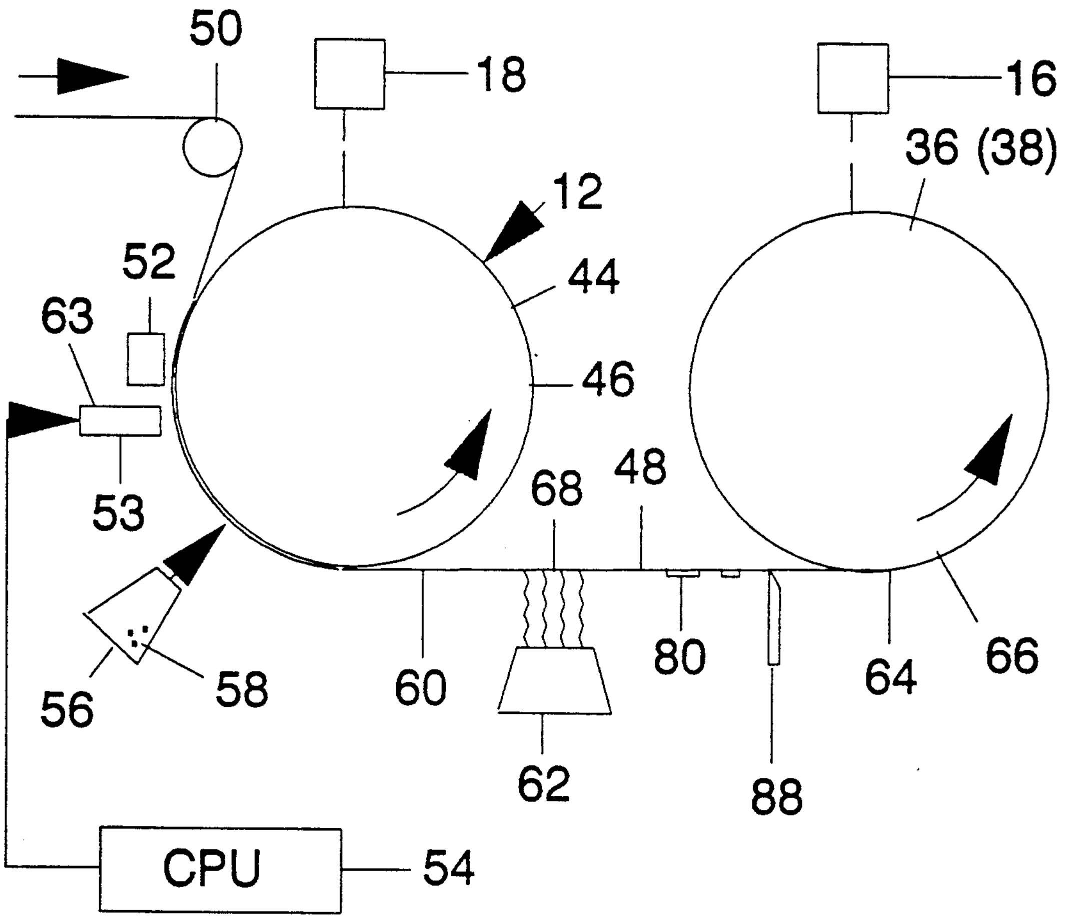
FIG. 2 is a diagrammatic view of the imaging system of the present invention.

Referring now to FIG. 2, the imaging system 12 has an imaging cylinder or roll 44 associated with one of the print rolls 36 or 38. The image roll 44 has an outer surface 46, such as a suitable conductor or semi-conductor, which, if desired, may comprise an outer layer 102 of the cylinder 44 defining the outer surface 46. The system 12 also has a charge permeable elongated film 48, such as a suitable plastic material. The system 12 has a roll 50 over which the film 48 passes, and which positions the film 48 around a portion of the outer surface 46 of the image roll 44.

Figure 3:
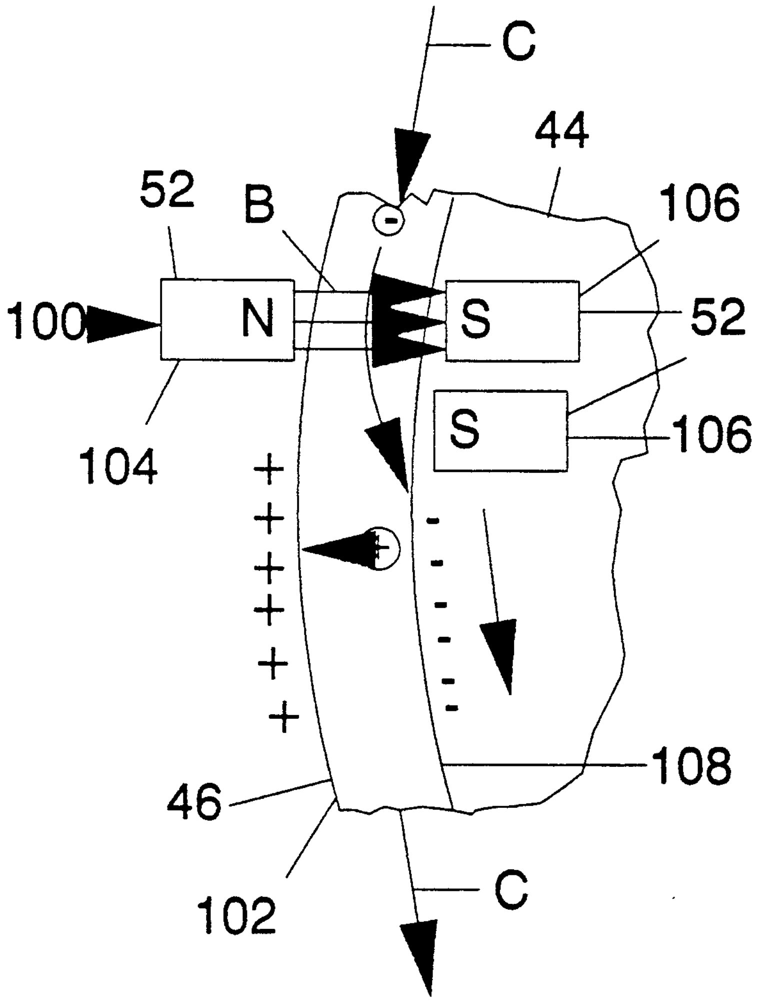
FIG. 3 is a diagrammatic view of a device for inducing a charge of a first polarity on an outer surface of a cylinder.

The system 12 has a device 52 which induces an electrostatic charge of a first positive polarity laterally along the outer surface 46 of the imaging roll 44. As shown in FIG. 3, the charge inducing device 52 may comprise any suitable system for inducing a positive charge on the outer surface 46 of the imaging cylinder 44, such as a magnetic system 100 which deflects movement of charges adjacent the outer surface 46 according to the Hall Effect. The cylinder 44 may have the outer layer 102 constructed from a conductive material, such as a suitable metal, or a semi-conductor material which may be appropriately doped with a suitable impurity in order to increase the number of charge carriers and improve conduction in the outer layer 102.

The magnetic system 100 may have a first outer magnet 104 having a pole N facing the outer surface 46 of the roll 44, and a plurality of second magnets 106 internal to the imaging roll 44 and having a S pole facing the outer surface 46 of the imaging roll 44 in order to generate a magnetic field B in the region of the layer 102. As shown, the system 100 passes a current C through the outer layer 102 through use of a suitable potential which causes electrons to flow in the outer layer 102 adjacent the outer surface 46 of the imaging roll 44. As shown, the electrons passing through the layer 102 are deflected by the magnetic field B towards an inner surface 108 of the layer 102 while positive charges migrate towards the outer surface 46 of the roll 44 or layer 102. In this manner, the system 100 induces a positive charge on the outer surface 46 of the layer 102 laterally across the roll 44 for a purpose described below.

Figure 7:
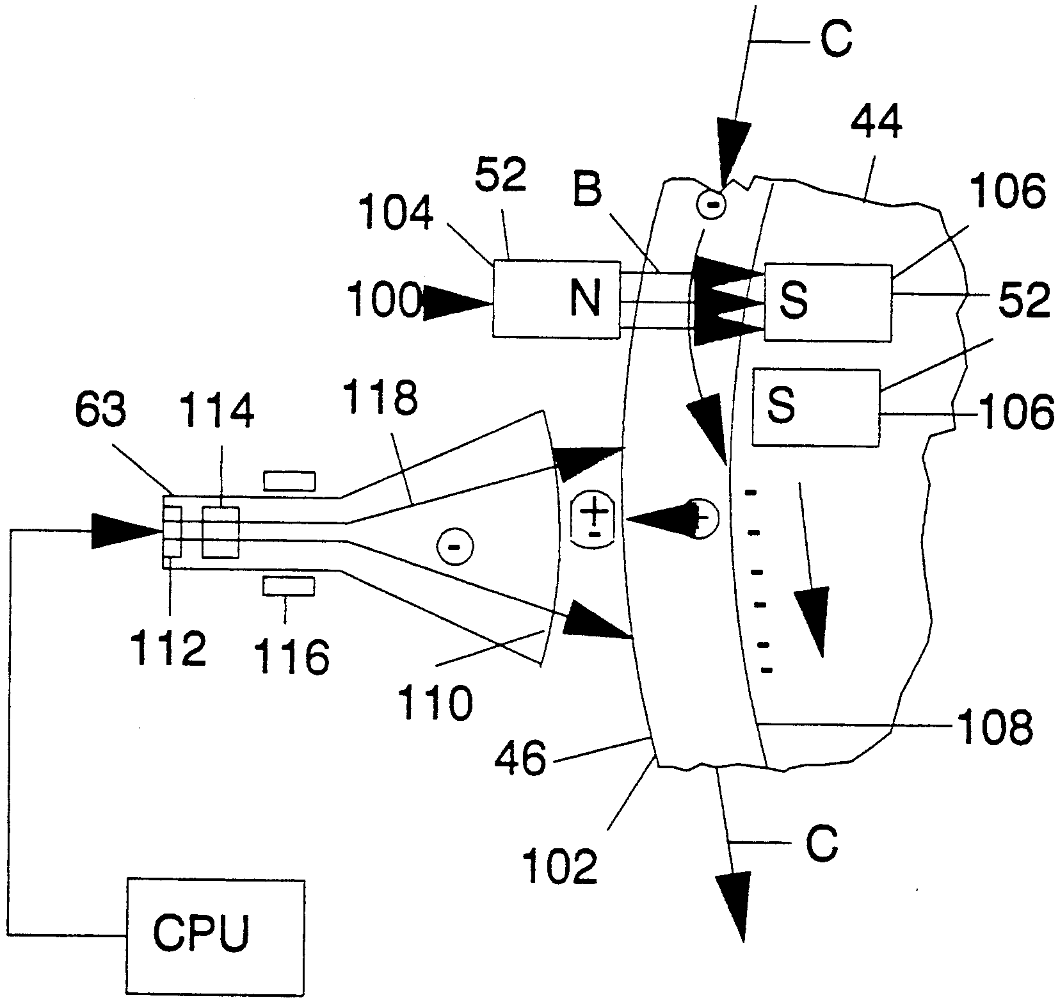
FIG. 7 is a diagrammatic view of a device for passing charged particles onto the outer surface of the cylinder.

The system 12 also has a charge transmitting device 53 for passing a beam of electrons of an opposite second negative polarity in a pattern or image through the film 48 onto the outer surface 46 of the imaging roll 44 in order to form a charged pattern of the first positive polarity on the outer surface 46 of the roll 44. As shown in FIG. 7, the charge transmitting device comprises a Cathode Ray Tube (CRT) 63, such as the type used for an oscilloscope or television picture tube, except that the use of fluorescent or other materials on the front face 110 of the CRT is eliminated. Thus, the CRT has a front transparent face 110 in order to pass the electrons in the electron beam through the transparent front face 110 onto the outer surface 46 of the roll 44 or outer layer 102. The electron beam may be controlled by a Central Processing Unit (CPU) as will be discussed below in order to form the desired pattern of the electron beams on the outer charged surface 46, and the positive charge on the front surface 46 of the roll 44 is combined with the electrons passing onto the surface 46 in the controlled regions, thus leaving a residual positive charge in a charge pattern or image on the front surface 46 of the roll 44. The CRT may have a cathode 112, a focusing device 114, and a deflecting coil 116 in order to generate and transmit the scanning beams 118 of electrons to form the desired pattern of positive charge on the outer surface 46 of the imaging roll 44.

The charge transmitting device 53 thus causes a pattern or image of the electrons to be transmitted through the film 48 onto the cylinder 44. In the impacted areas of the image on the cylinder 44 positive and negative charges combine to dissipate the charge in these areas, while the nonimpacted areas of the image on the cylinder 44 retain the residual positive charge. In this manner, a charged image or pattern of the first positive polarity is formed on the outer surface 46 of the image roll 44. The charge pattern may comprise the image areas to be printed on the web 14, or may comprise the non-image areas of the web 14, if desired.

As shown in FIG. 2, the system 12 has the computer 54 or Central Processing Unit (CPU) having a Read Only Memory (ROM) and a Random Access Memory (RAM) connected to the charge transmitting device 53. The CPU supplies information from the memory of the CPU concerning a print image to the charge transmitting device 53 in order to control and form the charged image on the outer surface 46 of the image roll 44.

As shown, due to friction, the film 48 passes beneath a device 56 for passing a charged particulate material 58, such as a synthetic toner having frictional electric properties having a powder and small spheres, such as steel or quartz with a thermoplastic coating, onto an outer surface 60 of the film 48, with the toner mixture inducing an electric charge of a second negative polarity opposite to the first positive polarity on the powder, and inducing a charge of the first positive polarity on the spheres when in motion, such that the powder initially is attracted to the spheres. The charged image of positive polarity formed on the outer surface 46 of the image cylinder 44 attracts the powder with greater force than the spheres, and causes the particulate material to form a pattern in the shape of the desired print image on the outer surface 60 of the film 48. During this time, the image cylinder 44 may be rotated by a suitable motor 18.

The particulate material has a bonding material for solidifying and bonding the particulate material onto the film. The solidifying material, such as a varnish material, may comprise a solvent, and the solvent may be mixed with the particulate material.

The film 48 then passes to a fusing system 62 which may bond the formed image of particulate material with the application of heat onto the outer surface 60 of the film 48, with the thermoplastic coating of the spheres melting in the presence of heat, and maintaining the powder in place in the image after heating and cooling.

The film 48 then passes to the print cylinder 36 or 38 where the film 48 is severed into segments 64 by a suitable knife 88, and the segments 64 are sequentially placed upon an outer surface 66 of the print roll 36 or 38. During this time, the print cylinder 36 or 38 may be rotated by a suitable motor 16.

Figure 8:
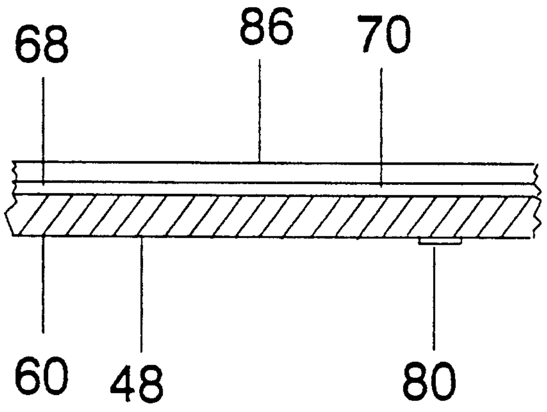
FIG. 8 is a fragmentary sectional view of a film for use in the imaging system of the present invention.

With reference to FIG. 8, an image 80 of particulate material 58 is formed on the outer surface 60 of the film 48, and an inner surface 68 of the film 48 may have a suitable adhesive 70, such as a pressure-sensitive or heat activated adhesive for releasably securing the film 48 onto the outer surface 66 of the print roll 36 or 38. In the case of the heat activated adhesive 70, the film 48 may be placed upon the outer surface 66 of the print roll 36 or 38, and then the film 48 is heated in order to activate the adhesive 70 and secure the film 48 in place on the print roll 36 or 38. Once the printing has been completed, the film 48 and adhesive 70 may be heated again in order to release the film 48, which may then be removed from the print roll 36 or 38. The film 48 may have a release sheet 86 releasably covering the adhesive 70, with the release sheet 86 being removed from the adhesive 70 prior to placement of the film 48 on the print cylinder 36 or 38. In an alternative form, the outer surface 60 of the film 48 may have a release coating, such as silicone, and the film 48 may be wound into a roll with the adhesive 70 contacting the outer release surface 60 of the film 48.

In a preferred form, the outer surface 60 of the film 48 is hydrophilic and the particulate material 58 is oleophilic in order to form the printing image 80 and non-image areas for the control of ink and water from a suitable ink supply and dampening system in order to transfer the printed image to the blanket roll 40 or 42. In this case, the particulate material 58 forms the desired image to be printed on the web 14. In an alternative form, the outer surface 60 of the film 48 is oleophilic, and the particulate material 58 is hydrophilic, such that the non-particulate areas on the outer surface of the film 48 forms the print image for placement on the printed web 14. The hydrophilic surface 60 of the film 48 may be provided by selection of the film such as the plastic material, or by corona treatment of the outer surface 60 of the film 48.

The image cylinder 44 may remain at a fixed position relative to the print cylinder 36 or 38, or the image cylinder 44 may be removed and placed at a remote position relative to the print cylinder 36 or 38.

In this manner, the print image 80 is directly formed on the outer surface 66 of the print rolls 36 or 38 in the direct-to-press system 12. The system 12 automatically forms the image of particulate material through use of the computer 54 in a simplified and rapid manner, and eliminates the need for plates and plate cylinders which render the preparation of the press 10 relatively inefficient. The system 12 of the invention improves the registration of the print images in the various print cylinders 36 or 38 which form the images of the different colors of ink. The system 12 of the invention eliminates the necessity of surface preparation of the print rolls 36 or 38, and the film 48 may be readily removed after the printing has been completed. The used film 48 may be disposed of in a simplified manner. In addition, the film 48 may be placed upon the print rolls 36 or 38 in an improved and precise manner. The system 12 also eliminates the need to clean the outer surface of the print rolls 36 and 38 after the printing has been completed, and also reduces the wear of the print rolls 36 and 38 otherwise caused by cleaning. The system 12 also eliminates the need for using scrubbing or solvent agents to clean the outer surface 66 of the print rolls 36 and 38.

Figure 4:
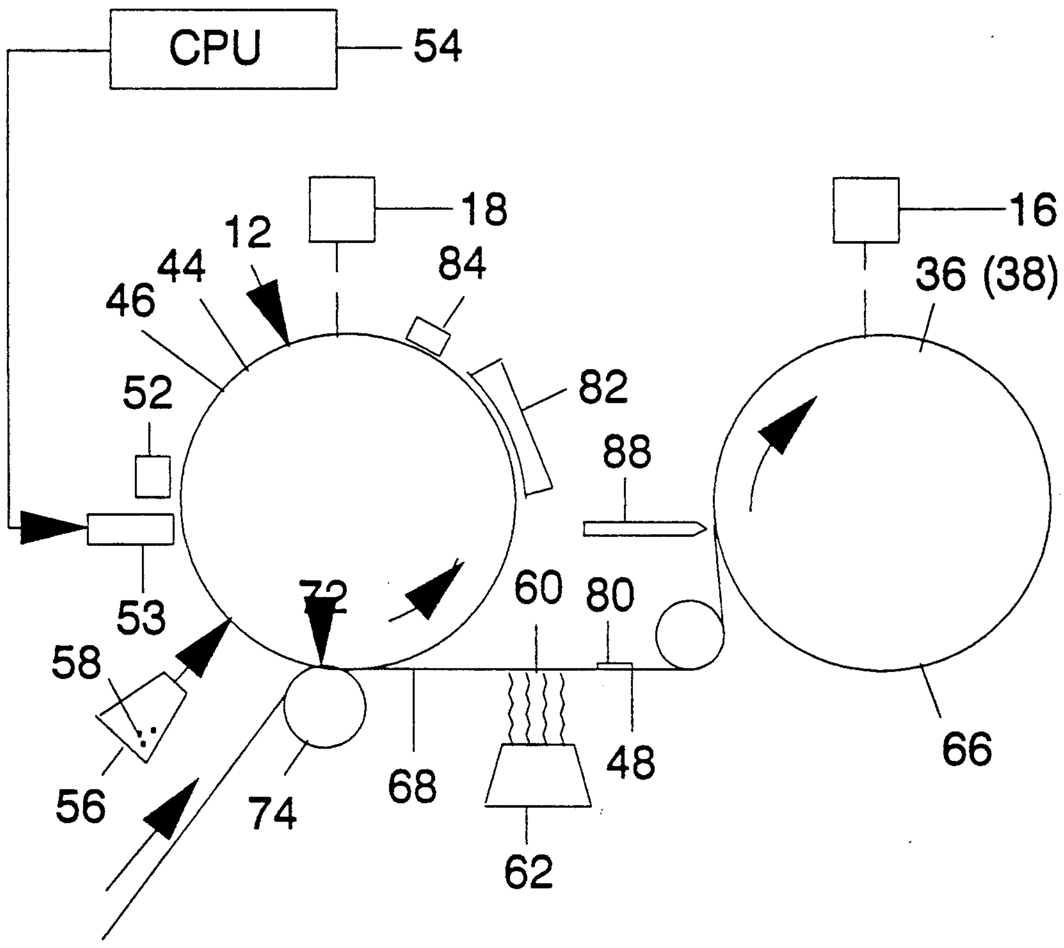
FIG. 4 is a diagrammatic view of another embodiment of the imaging system of the present invention.

Another embodiment of the present invention is illustrated in FIG. 4, in which like reference numerals designate like parts. In this embodiment, the system 12 also has an imaging or image cylinder 44 having a conductor or semi-conductor defining the outer surface 46, as previously described. The system 12 has a charge inducing device 52 which forms a charge of first polarity on the outer surface 46 of the image cylinder 44, as previously described. The system 12 has a charge transmitting device 53, as previously described, which may be controlled by the CPU in order to form a charged image of first positive polarity on the outer surface 46 of the imaging roll 44. The charged image then passes during rotation of the roll 44 to the toner device 56 which passes charged particulate material 58 of the type previously described onto the outer surface 46 of the image roll 44 as the roll 44 rotates. In this case, the image is directly formed on the outer surface 46 of the image cylinder 44.

As shown, the system 12 has an elongated film 48, such as a polymer film, or foil, such as MYLAR, a trademark of E.I. DuPont deNemours. As shown, the film 48 passes between the nip 72 between a roller 74 and the outer surface 46 of the image roll 44. During this time, a charge of a second negative polarity is given to the particulate material 58 as it passes from the toner device 56 to the image cylinder 44, and the film 48 is given a charge of an opposite first positive polarity, such that the particulate material 58 is electrically attracted to the charged film 48 with a greater electrostatic force than the electrostatic force of the particulate material 58 to the outer surface 46 of the image cylinder 44.

In this manner, the particulate image 80 is transferred from the outer surface 46 of the image cylinder 44 in the pattern of a print image to the outer surface 60 of the film 48. The film 48 is then passed through the fusing system 62 which heats the particulate image, and bonds the image 80 to the outer surface 60 of the film 48, or the particles may be bonded in other manners, as previously described. Finally, the film 48 is severed, and is releasably attached to the outer surface 66 of the print cylinder 36 or 38 in order to place the film with transferred image on the print cylinder 36 or 38, as previously described. The system 12 has a cleaning station 82 to remove any residual particulate material 58 from the outer surface 46 of the imaging cylinder 44, and a decharging system 84 to remove the residual charge from the cylinder 44 in order to prepare the imaging cylinder 44 to form a subsequent print image on the cylinder 44. In other respects, the system 12 of FIG. 4 operates substantially the same as the system 12 previously discussed in connection with FIG. 2. As before, the film 48 is removed from the print roll 36 or 38 after printing has been completed.

Figure 5:
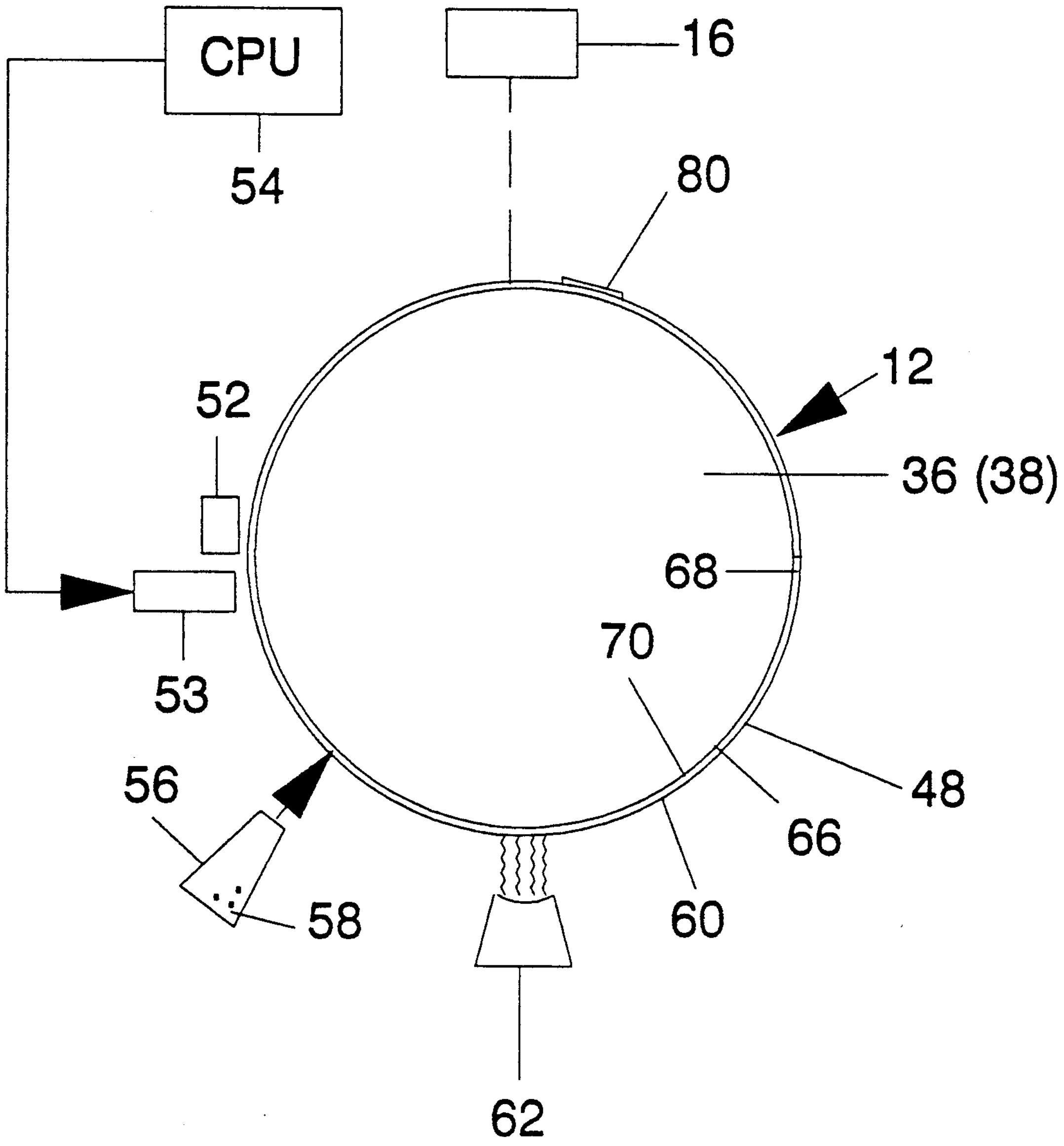
FIG. 5 is a diagrammatic view of another embodiment of the imaging system of the present invention.

Another embodiment of the present invention is illustrated in FIG. 5, in which like reference numerals designate like parts. In this embodiment, the film 48 is first placed over the outer surface 66 of the print roll 36 or 38, such as by adhesive, as previously described. In one form, the film 48 has an outer surface which is constructed from a conductor or semi-conductor, such as the materials previously described for the roll 44. In this case, the charge inducing device 52 places a charge of the first positive polarity on the film 48, and when this portion of the film 48 passes beneath the toner device 56, the charged toner or particulate material 58 of a second negative polarity is attracted to the charged pattern formed on the outer surface 60 of the film 48.

In an alternative form, the image cylinder 44 has a conductor or semi-conductor defining the outer surface 46, and the attached film 48 is charge permeable, such that the charge of the first positive polarity is placed by the charge inducing device 52 onto the outer surface 46 of the image cylinder 44 beneath the film 48, and the charge transmitting device 53 forms a pattern or image in the form of a charge image on the outer surface of the print roll 36 or 38. In this case, the charged particulate material 58 of a second negative polarity in the toner device 56 is electrically attracted to the charged image pattern on the outer surface 46 of the image cylinder 44, and thus forms a pattern in the form of the image 80 on the outer surface 60 of the film 48.

In either event, the image formed by the particulate material 58 on the outer surface 60 of the film 48 is bonded by the fusing system 62, or otherwise, in a manner as previously described. Since the film 48 is placed on the plate cylinder 36 or 38, the system 12 eliminates any possible distortion of the film, such as caused by heating. In other respects, the system 12 of FIG. 5 operates in a manner as previously described in connection with the system 12 of FIG. 2.

Figure 6:
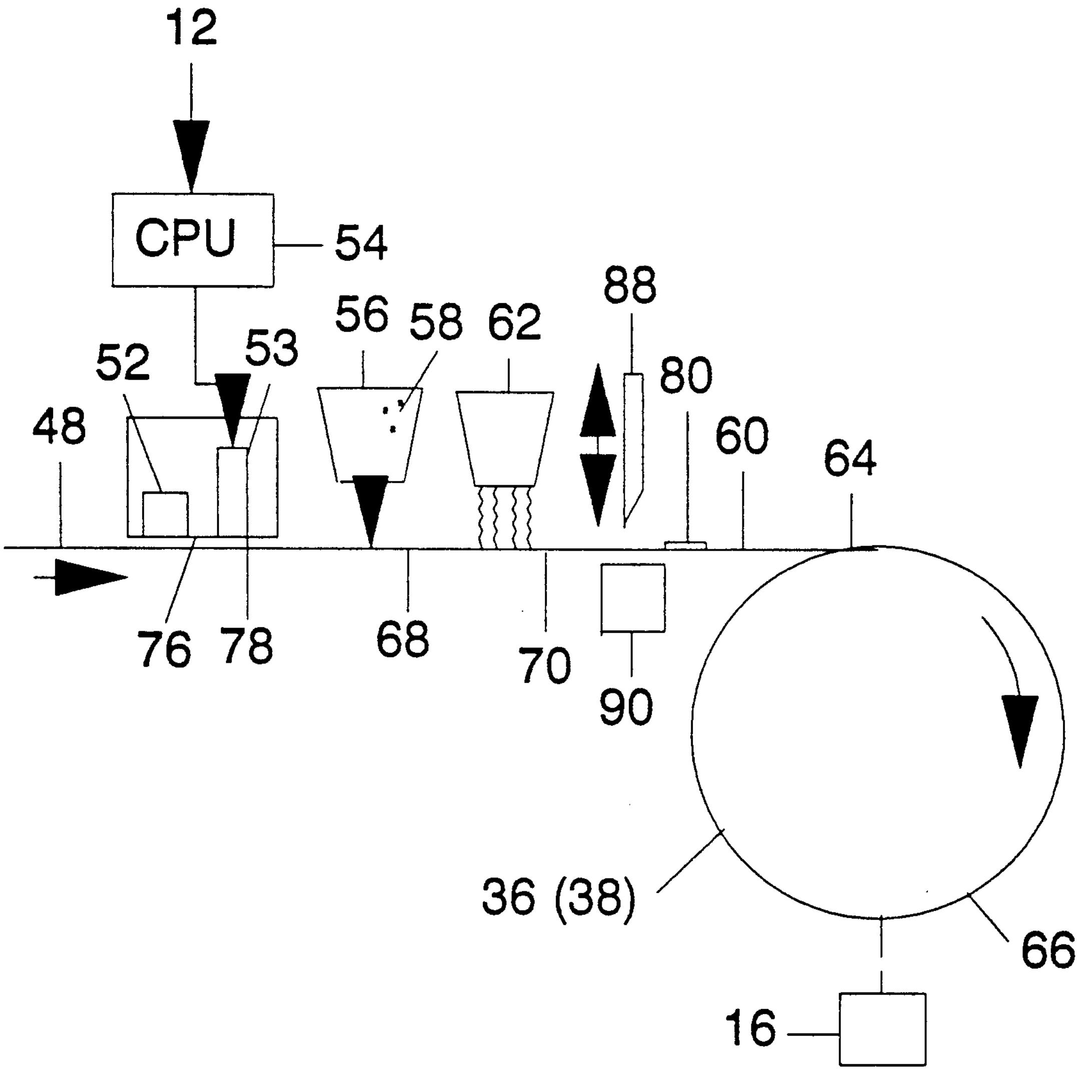
FIG. 6 is a diagrammatic view of another embodiment of the imaging system of the present invention.

Another embodiment of the present invention is shown in FIG. 6, in which like reference numerals designate like parts. In this embodiment, the film 48 passes an outer surface 76 of an imaging device 78 having a charge inducing device 52 and charge transmitting device 53, as previously described. In this embodiment, the film 48 has a conductor or semi-conductor defining the outer surface 60, as previously described. The devices 52 and 53 place a charge in the form of a print image, as controlled by the CPU, on the outer surface 60 of the film 48, and charged particulate material of the second negative polarity is passed by the toner device 56 onto the outer surface 60 of the film 48. In this manner, a print image 80 is formed on the outer surface 60 of the film 48 in the pattern of the image, after which the particulate material is bonded to the film 48 by the fusing system 62, as previously described. The film 48 is then severed into segments 64 by a knife 88 and anvil 90, and the segments 64 are releasably placed on the outer surface 66 of the print roll 36 or 38, in a manner as previously described. In other respects, the system 12 of FIG. 6 operates substantially in the manner of the system 12 previously discussed in connection with FIG. 2.

The foregoing detailed description has been given for clearness of understanding only, and no unnecessary limitations should be understood therefrom, as modifications will be obvious to those skilled in the art.

What is claimed is:

1. An imaging system for a printing press, comprising:
   - an imaging cylinder having an outer surface mobile to movement of a charged particle;
   - means for inducing a charge on said outer surface of a first polarity;
   - a charge permeable film;
   - first means for passing the film over at least a portion of the outer surface of said imaging cylinder;
   - second means for passing charged particles of a second polarity opposite to the first polarity in a pattern through said film onto the outer surface of the imaging cylinder;
   - third means for passing a charged particulate material of the second polarity opposite to the first polarity onto the film over a pattern information on the cylinder to form an image of the particulate material on the film;
   - means for bonding the particulate material onto the a print cylinder having an outer surface; and
   - means for placing a segment of the film over the outer surface of the print cylinder.

2. The system of claim 1 wherein the particulate material comprises a toner.

3. The system of claim 1 wherein the bonding means comprises means for fusing the particulate material on the film.

4. The system of claim 1 wherein the charge of first polarity is a positive charge, and in which the charged particles of second polarity comprise electrons having a negative polarity.

5. The system of claim 1 wherein the placing means includes means for severing the segment of the film for placement over the outer surface of the print cylinder.

6. The system of claim 1 including means for removing the film segment from the print cylinder.

7. The system of claim 1 wherein the placing means includes an adhesive on an inner surface of the film facing the print cylinder.

8. The system of claim 7 wherein the adhesive is a heat activated adhesive.

9. The system of claim 1 wherein an outer surface of the film is hydrophilic, and wherein the particulate material is oleophilic 10. The system of claim 1 wherein the particulate material is hydrophilic, and in which an outer surface of the film is oleophilic.

11. The system of claim 1 wherein the third passing means comprises means for blowing the particulate material onto an outer surface of the film while inducing the charge of the second polarity to the particulate material.

12. The system of claim 1 including means for supplying information to the second charge passing means.

13. The system of claim 12 wherein the supplying means comprises a computer.

14. The system of claim 1 wherein the second charge passing means comprises means for generating and passing a beam of electrons in the pattern.

15. The system of claim 14 wherein the generating and passing means comprises a cathode ray tube having a transparent front face for passing electrons out of the cathode ray tube.

16. The system of claim 1 wherein the outer surface of the imaging cylinder comprises an outer layer of a semi-conductor material.

17. The system of claim 16 wherein the outer surface of the imaging cylinder comprises an outer layer of conductive material.

18. The system of claim 1 wherein the bonding means comprises a material to solidify the particulate material.

19. The system of claim 18 wherein the solidifying material comprises a solvent, and including means for mixing the solvent with the particulate material.

20. The system of claim 18 wherein the solidifying material comprises a varnish material.

21. The system of claim 1 wherein the charge inducing means comprises means for generating a magnetic field in an outer region of the imaging cylinder.

22. An imaging system for a printing press, comprising:

an imaging device having an outer surface which is mobile to movement of charged particles;

a film having an outer surface;

means for inducing a charge of a first positive polarity on the outer surface of the imaging device;

means for passing the film over the outer surface of the imaging device;

means for passing a beam of electrons of a second negative polarity opposite to the first positive polarity in a pattern through the film onto the outer surface of the imaging device;

means for passing a charged particulate material of the second negative polarity opposite to the first positive polarity onto the outer surface of the film;

means for bonding the particulate material on the film;

a print cylinder having an outer surface; and means for placing a segment of the film over the outer surface of the print cylinder.

* * * * *